Figure 3:
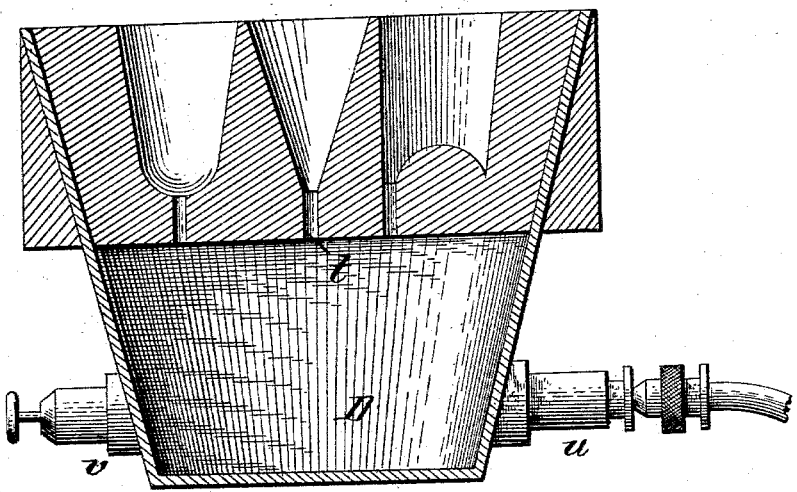

(No Model.) 2 Sheets—Sheet 1.
W. G. BRISTOW.
METHOD OF AND MEANS FOR MOLDING PLASTIC MATERIAL.
No. 589,637. Patented Sept. 7, 1897.
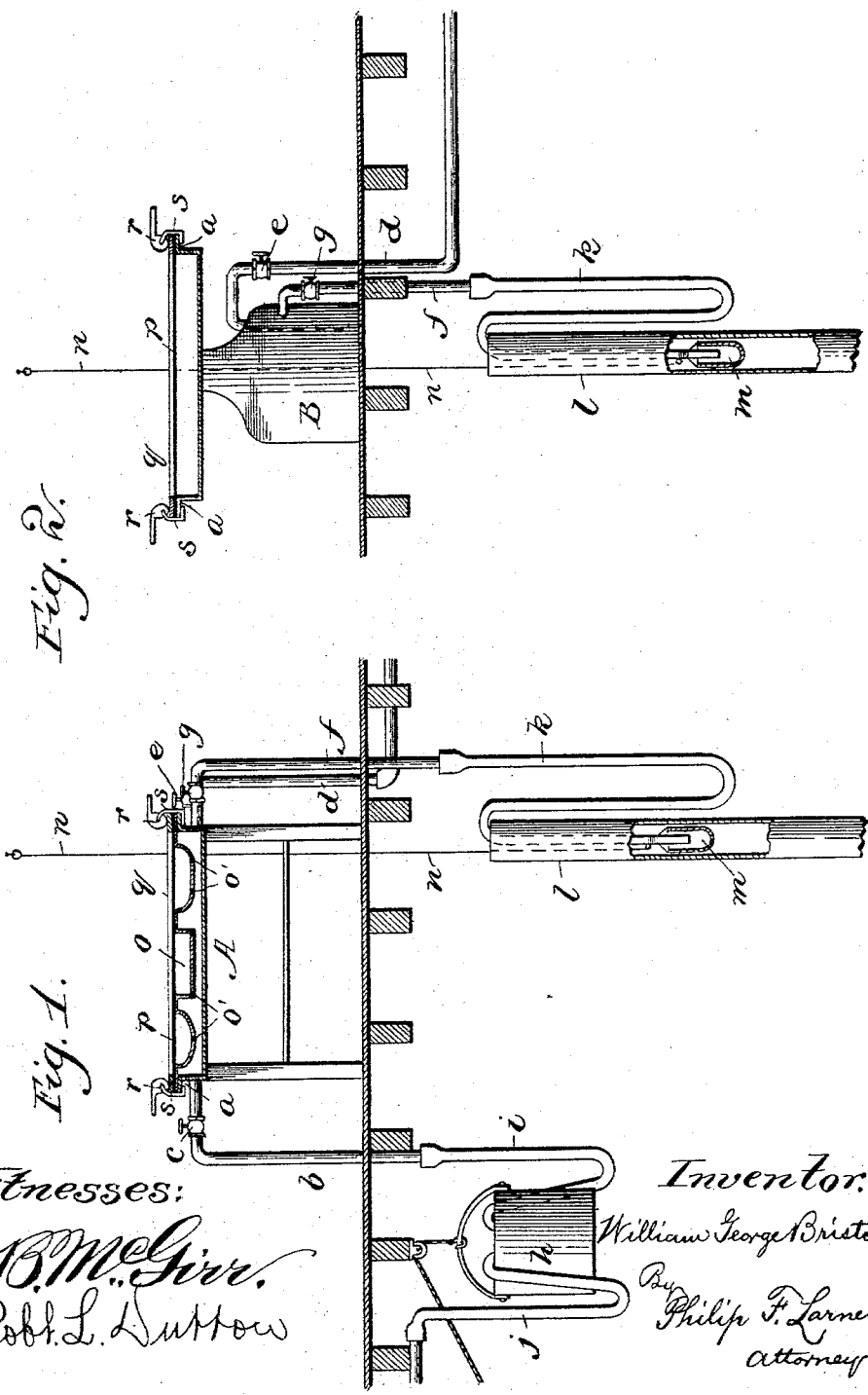
Witnesses:
J. B. McGirr.
Robt. L. Dutton.
Inventor:
William George Bristow.
By Philip F. Larner.
Attorney.

(No Model.) 2 Sheets—Sheet 2.

W. G. BRISTOW.
METHOD OF AND MEANS FOR MOLDING PLASTIC MATERIAL.

No. 589,637. Patented Sept. 7, 1897.

Witnesses:
J. B. McGirr.
Robt. L. Dutton.

Inventor.
William G. Bristow.
By Philip F. Larner.
Attorney.

United States Patent Office.

WILLIAM GEORGE BRISTOW, OF MEDICINE LODGE, KANSAS.

METHOD OF AND MEANS FOR MOLDING PLASTIC MATERIAL.

SPECIFICATION forming part of Letters Patent No. 589,637, dated September 7, 1897.

Application filed March 28, 1896. Serial No. 585,205. (No model.)

*To all whom it may concern:*

Be it known that I, WILLIAM GEORGE BRISTOW, a citizen of the United States, residing at Medicine Lodge, in the county of Barber and State of Kansas, have invented a certain new and useful Method of and Means for Molding Plastic Materials; and I do hereby declare the following to be a full, clear, and exact description of the invention, such as will enable others skilled in the art to which it appertains to make and use the same.

My said invention is designed for the molding of such materials as plaster-of-paris, cement, china-clay, putty, confectionery, composition, and other ornaments for picture-frames and numerous other ornamental household articles wherein material of a plastic character is employed; and my said invention is especially applicable in all cases where it is essential that the articles molded shall be produced with clear smooth surfaces and sharp outlines of the ornamentation, having also particular reference to that class of molds which are adapted to make such fine and delicate lines as are usually carved by hand. By my method I am enabled to make moldings for various uses where ornamental designs are required cheaper and better than has been done heretofore.

In carrying out my invention I employ, according to requirements, a thin or a thick sheet of rubber tissue, which is placed on top of the design in the mold, and it is generally used in connection with means to cause the tissue to be forced into the mold by exhausting air, steam, &c., from a receptacle containing the mold or by a siphon or air-pump, the releasing of the pressure causing the rubber tissue to promptly leave the surface of the mold and carry with it the casting. By this method I am enabled to dispense with the use of oil and other similar materials commonly employed in molding operations to prevent the sticking of the plastic material to the molds, and I am also enabled to form an indefinite number of castings from the same mold, the last of which is as perfect as the first casting. In some instances the shape of the ornaments will vary from a faint outline to a bold relief, according to the amount of pressure employed, which can be governed by proper regulation of the apparatus, as hereinafter described.

In my method I also employ as desirable means therefor a table or platform the top of which is open for the reception of a mold and having suitable means connected with said table to cause the rubber tissue to assume the lines of the design and after the cast has been made to release the tissue from the mold, carrying the completed casting with it, and at the same time the design is readily removed from the tissue by reason of the latter being relaxed from its expanded position.

In the accompanying drawings, Figure 1 is a partial sectional view illustrating one form of desirable means for carrying out my invention, designed particularly for casting heated material which hardens by cooling. Fig. 2 is a view of an apparatus designed more especially for the casting of cold materials which harden by the action of water. Fig. 3, Sheet 2, is an additional modification illustrating a desirable form of molding apparatus.

In the drawings, A, Fig. 1, designates a table the top of which is open and having flanges $a$ around the upper edge thereof. This table is mounted upon suitable supports at a proper height above the floor of a building. To the top, at one end of the table, I attach a pipe $b$, which is connected to the water-supply of the building, and said pipe $b$ is provided with a valve $c$ for the purpose of turning on and off the supply of water from this end of the apparatus. At any convenient point I attach another supply-pipe $d$, which is also connected to the water-service, but this pipe is direct from the street, said pipe having a valve $e$ for controlling the supply of water to the mold-box or table-top. Attached to the mold-box, at the opposite end of the table from pipe $c$, is still another pipe $f$, having a valve $g$ for controlling the flow of water from the same to the sewer.

I have illustrated a convenient way of securing a tank $h$ under the floor, said tank having the well-known flush-tank arrangement for allowing the water to run and a ball-float (not shown) for cutting off the supply. The top of the tank, as is usual, is open, and said tank is so arranged that it can be raised and lowered by the operator in any convenient manner. Said tank and pipe $b$ are connected together by a flexible pipe $i$, and to the other side of the tank is another flexible pipe $j$, which connects the tank with the water-supply, the object of these flexible connections being to permit the raising and lowering of the tank for securing the desired pressure on the mold, as will be hereinafter described. Under the floor I also attach another flexible pipe $k$ to pipe $f$, the lower end of which is dropped or hangs into a wastepipe $l$ and is fitted with a cup $m$, the lower end of pipe $k$ having also attached to it a wire or rope $n$, which allows the operator to raise or lower the pipe when the same is desirable.

On the flanges $a$ of the table-top the plate with the desired designs $o$ is to be placed, (each design or mold having suitable air-openings $o'$ in the base thereof,) and over the same is placed a sheet of rubber tissue $p$, and over the design-plate $o$ and the rubber tissue $p$ is placed a skeleton frame $q$, the whole being locked together by the cam-shaped clamps $r$, which have an under cleat $s$, which locks the whole safely air-tight together.

By means of the above-described arrangement of tank $h$ with flexible connecting-pipes $i$ $j$ and float-valve and the flexible pipe $k$ in pipe $l$ I am able to create and maintain a continuous flow of water through the moldbox and around the mold, rapidly cooling the material being molded. The rubber tissue being held in the mold by the weight of the water in the flexible pipes the pressure can be varied, according to the requirements of each design to be cast, by raising or lowering the tank $h$ and pipe $k$.

The operation of the apparatus illustrated in Fig. 1 is as follows: The plate $o$, containing the desired designs, is placed in the top of the table A. Then the sheet of rubber tissue $p$ (which is generally of the size of the design-plate) is suitably placed over the same and on top of this is placed the skeleton frame $q$, the whole being clamped air-tight together, as before stated, by the clamps $r$. The valves $c$, $e$, and $g$ being opened the water will rush into the mold-box and pass down pipes $f$ and $b$, filling the flexible pipes $i$ and $k$. When the mold-box and pipes are filled, the valve $e$ in pipe $d$ is closed and the water will pass out into and through the pipe $f$ into flexible pipe $k$, because the latter is lower than pipe $i$, and the weight of the water in the pipes $i$ and $k$ will draw the rubber tissue $p$ down into the design. The weight of the water in the pipes $i$ and $k$ will equal about one pound for every two feet of height in the pipes, and this pressure or weight, as hereinbefore indicated, is governed by raising or lowering the pipe $k$ and the tank $h$, thereby exhausting the atmosphere from under the rubber tissue. The atmospheric pressure operating above said tissue causes the same to be depressed into the inequalities of the mold. The mold is now filled with the material to be cast, and after the same has been allowed time to set the valves $c$ and $g$ on pipes $b$ and $f$ are closed and valve $e$ on pipe $d$ direct from the water-supply opened, with the result that the water will rush into the moldbox and raise the tissue from the same and cause the cast to lie freely on the top of the tissue. The valves $c$ and $g$ being opened during the molding process permits the water to pass freely from tank $h$ up and through the mold-box and down pipe $k$, thereby cooling the material being molded. On removing the cast and opening the valves $c$ $g$, valve $e$ being closed, the rubber tissue $p$ will again be drawn into the mold, and by refilling with the warm plastic material the operation is carried on indefinitely.

The free end of the flexible pipe $k$ must in practice be a little lower than the water-line in the tank $h$, so as to allow the water to pass from the tank $h$ up and through the mold-box and close around the material to be molded, rapidly cooling the same. When both the tank $h$ and the free end of pipe $k$ are at their lowest position, there is a greater amount of pressure on the rubber tissue, and thus the same accommodates itself to the design of the mold more readily, it being understood that some designs require a greater amount of pressure than others.

As hereinbefore indicated, the apparatus as above described and illustrated in Fig. 1 is designed more especially for the casting of heated materials, which are cooled by the water passing into and through the mold-box. The apparatus shown in Fig. 2 is adapted for molding cold plastic materials—such, for instance, as plaster-of-paris—which harden by the action of water. The arrangement of the tank $h$ and its connecting flexible pipes (shown in Fig. 1) is unnecessary in this device, as it is immaterial whether air or water is in the mold-box.

In the apparatus shown in Fig. 2 I place under the molding-table a reservoir B for the purpose of causing a vacuum in the table-top or mold-box. The connections of pipes, instead of being with the table, are made direct to the reservoir. In this case I employ only one supply-pipe $d$, provided with a valve $e$ and a vacuum or waste pipe $f$, with valve $g$, arranged in the manner shown. By this arrangement I am able to create a vacuum by water and a siphon. The waste-pipe connection $l$ with the flexible hose $k$ is substantially the same as described in connection with the apparatus shown in Fig. 1. In the operation of this form of apparatus when ready for the molding operation the water is permitted to fill the reservoir B and pass out through the waste-pipe. Upon closing the supply-pipe the water will continue to flow down the waste-pipe and create a vacuum in the mold-box, which will draw the rubber tissue down into the mold. The pressure or weight of the water is governed by raising or lowering the cup-valve $m$ in the open waste-pipe. The lower the valve is in the waste-pipe the greater amount of atmospheric pressure will operate above the tissue and cause the same to be depressed into the inequalities of the mold. After the cast has been hardened the valve $g$ in the waste-pipe is closed and supply-pipe $d$ opened, when water will rush in and raise the rubber tissue and the cast from the mold. Close the supply-pipe valve $e$, remove the casting, and open the waste-pipe valve $g$, and the rubber tissue will be again drawn into the mold, and the molding operation can be repeated.

I have shown in Fig. 3, Sheet 2, a mold mounted in a cup-shaped receiver D, which has attached to it two valves $u\ v$, through which air passes. The mold in this instance has small perforations $t$ at the base of each design in order that the air may escape and allow the rubber tissue to conform to the design. The mold having been mounted in the cup, the rubber tissue is placed over the same and secured around the sides in any convenient manner. To the valve $u$ I attach an ordinary vacuum-pump, produce the suction in the cup, and by reason of the mold-designs having the perforations $t$ the tissue is caused to adhere closely to the designs. When the mold is thus ready, the material to be cast is put into the mold, and after being left long enough to set the valve $v$ is opened. When the air is admitted to the cup, the cast will be raised from the mold and lie on the top of the tissue, the latter freeing itself from sticky substances.

Oils, varnish, &c., as they have been used in prior molding processes to prevent the sticking of the material to the molds do not permit the bringing out of fine designs in a satisfactory manner from the fact that the oil or varnish fills the fine lines of the designs to be cast, while by my process the rubber tissue is caused to spread evenly over the entire design, as herein explained.

When the design has been cast and cooled, it is readily removed without turning the mold upside down, as is usual in many prior molding apparatus. Again, by the use of the rubber tissue placed over the mold, as proposed by me, the object is released from the mold by the action of the rubber in many cases. It is apparent that when the exhaustion of the air from the apparatus commences the tissue will immediately proceed to conform to the design, and the latter when the air has been expelled has the appearance of a mold having a thin coating of varnish, and therefore with the tissue the delicate lines of the design are not lost in the cast.

On picture-frame moldings to be provided with ornamental designs such designs can be made with a greater depth, producing ornamentation of greater relief by my process than has been accomplished heretofore. The wood or other frame having been made the design can be applied and form one continuous molding without joints.

It will be seen that I am enabled to make very smooth ornaments and at the same time prevent the material sticking to the mold. By my process the work can also be accomplished in much shorter time and I can cast more frail and delicate designs or ornaments than has heretofore been done.

Should it be desired to color or variegate in any way the object to be cast, the same can be done by coloring the rubber tissue in any suitable manner before the pressure has caused the said tissue to assume its position in the mold-box. This has been found to be very desirable in some instances, especially in the casting of plaster-of-paris, and also in confectionery, where candies, &c., are made in many forms and colors, and the colors are transferred from the tissue to the material molded. My novel process has also been found of great value in dental-work casting.

Having thus described my invention, I claim as new and desire to secure by Letters Patent—

1. The herein-described method of molding plastic material which consists in creating a partial vacuum beneath a flexible tissue placed over a pattern, and thereby drawing the tissue into the pattern, casting the plastic material within the tissue thus drawn into the mold, hardening the material in said tissue, and then restoring the pressure beneath the tissue, forcing it from the pattern and releasing the cast from said tissue, substantially as and for the purposes described.

2. The herein-described method of molding and coloring plastic materials which consists in distributing coloring-matter on an expansible tissue sheet placed over a pattern, drawing the tissue sheet into the pattern by creating a partial vacuum thereunder, casting the plastic material in the tissue in contact with the coloring-matter, hardening the plastic material in the tissue, and then restoring the pressure beneath the pattern thereby releasing the tissue from the pattern and the cast from the tissue, substantially as described.

3. The herein-described method of molding plastic material which consists in drawing an expansible tissue sheet into a mold by creating a partial vacuum beneath the same, casting the plastic material directly into the tissue in the mold, cooling and hardening the same in the tissue by the pressure of water, and increasing the water-pressure beneath the mold to release the tissue from the pattern and the cast from the tissue, substantially as described.

4. In combination, a chamber open at the top, a pattern over the top thereof and having openings therein, a sheet of expansible tissue secured over the pattern and entirely covering the same and closing the chamber to the passage of air, means for creating a partial vacuum in said chamber so that the tissue is drawn down into and conforms to the shape of the pattern, the plastic material being cast directly into the tissue, and means for restoring the pressure in said chamber, thereby freeing the cast, substantially as described.

5. In an apparatus for molding plastic materials having a table or mold-box, a design plate or mold thereon, rubber tissue spread over the plate, a frame laid on the outer edges of the same, and clamps for locking the whole together, in combination with a water-supply pipe and a waste-water pipe, each having means for controlling the flow of water passing through the same, substantially as and for the purpose described.

6. In an apparatus for molding plastic substances, the combination of a design plate or mold applied thereto, a sheet of rubber tissue covering the same, means for clamping the whole air-tight, two water-supply pipes, one connected with a tank, and one with the direct service, and a pipe leading from the table or mold-box to the waste-pipe, and having on its lower or free end a cup, with means for raising or lowering both the pipe and cup, substantially as described.

7. The combination of a table or mold-box, a suitable design plate or mold, a sheet of rubber tissue over the same, the whole suitably clamped air-tight, a water-supply pipe from a tank, the same capable of being raised or lowered, a valve in said pipe to control the supply, a pipe providing a direct pressure, a valve for controlling said flow of water, a pipe leading from the mold-box to the waste-pipe, the aforesaid pipe having a flexible connection, the free end of which extends into the waste-pipe, and having a cup secured to the lower end of said flexible connection, with means for raising the same and the cup simultaneously, substantially as described.

In testimony whereof I affix my signature in presence of two witnesses.

WILLIAM GEORGE BRISTOW.

Witnesses:
JAMES HOBBS,
C. Q. CHANDLER.